(12) United States Patent
Scott et al.

(10) Patent No.: US 6,489,980 B1
(45) Date of Patent: Dec. 3, 2002

(54) SOFTWARE APPARATUS FOR IMMEDIATELY POSTING SHARING AND MAINTAINING OBJECTS ON A WEB PAGE

(75) Inventors: Edward D. Scott, Centerville, OH (US); Michael C. Cales, Bothell, WA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/222,738

(22) Filed: Dec. 29, 1998

(51) Int. Cl.[7] ................................................ G09G 5/00
(52) U.S. Cl. ........................................ 345/854; 345/853
(58) Field of Search ................................ 345/765, 744, 345/781, 840, 848, 853, 844, 738

(56) References Cited

U.S. PATENT DOCUMENTS 5,819,092 A * 10/1998 Ferguson et al. ............ 717/113
6,091,409 A * 7/2000 Dickman et al. ............ 345/839
6,313,835 B1 * 11/2001 Gever et al. ................. 345/854
6,340,977 B1 * 1/2002 Lui et al. ..................... 345/709

* cited by examiner

Primary Examiner—Cao H. Nguyen
(74) Attorney, Agent, or Firm—Lowe Hauptman Gilman & Berner LLP (57) ABSTRACT

A method and apparatus is disclosed for sharing and maintaining objects over the World Wide Web using an HTML compliant client running a web browser. An upload interface is displayed on the client computer for entry of upload information corresponding to an object stored on the client computer. In response to an upload request, the object is uploaded over the Internet to a server computer and stored on the server computer. A display of the server computer includes a representation of uploaded objects and is updated automatically after every upload. The display can be viewed on the client computer or any other client computer with access to the Internet through a web browser. Objects can be selected from the display and downloaded to a client computer over the Internet. Access to the objects can be limited through password protection or other methods.

27 Claims, 7 Drawing Sheets

---

Reload    Home    Search    Guide    Print    Security    Stop

Location  file:///HI/production/csglt/scripts/UPERR.HTM

HTTP  1101001011011001
file upload
1101001011011001           version 2

Yikes!

Something has gone terrible wrong. The scripts says:
errmsg - About the file #fname.
Depending on the error message you might or might not be able to correct it.
If you need to contact webmaster please make sure to report the error message.

| Filename: | | Browse |
|---|---|---|

Upload Date:

Version No.:      Password:

Description:

SOFTWARE APPARATUS FOR IMMEDIATELY POSTING SHARING AND MAINTAINING OBJECTS ON A WEB PAGE

FIELD OF THE INVENTION

The present invention relates to a method and apparatus for uploading and downloading objects over a computer network. More specifically, the present invention provides an apparatus and method for allowing a user to upload objects to a World Wide Web server over the Internet and for automatically and immediately making the objects available for downloading over the Internet by client computers running standard web browser software, without intervention by or assistance by a human administrator.

BACKGROUND OF THE INVENTION

The Internet is a worldwide network of computers linked together by various hardware communication links all running a standard suite of protocols known as TCP/IP (telecommunications protocol/internet protocol). The growth of the Internet over the last several years has been explosive, fueled in the most part by the widespread use of software viewers known as browsers and HTTP (hypertext transfer protocol) which allow a simple graphical user interface (GUI) to be used to control communications over the Internet. Browsers generally reside on the computer used to access the Internet, i.e. the client computer. HTTP provides users access to files of various formats using a standard page description language known as HTML, including its derivatives and successors (hypertext markup language). The collection of servers on the Internet using HITTP has become known as the "World Wide Web" or simply the "Web". Through HTML, and interactive programming protocols, the author of a particular web page, or pages, is able to make information available to viewers of the web page by placing the web pages on an Internet web server in HTML format. The network path to the server is identified by a URL (Uniform Resource Locator) and, generally, any client running a web browser can access the web pages by the URL.

The Web has become ubiquitous in businesses and homes because it has proven to be convenient for various applications, such as news and data delivery, the purchase of various products, conducting banking and investment transactions, and the like. The Web and its authoring, transmission, and display protocols, such as browsers, HTML, Common Gateway Interface (CGI), Active Server Pages™ and Java™, have become a worldwide standard for information exchange. In the near future, all computers may be web servers and various appliances, such as televisions, telephones, PCs, ATMs, cash registers, and the like, will be web clients with the ability to exchange data with other web clients. Even today, the Web has become a primary vehicle for the sharing of information. As a result, "virtual communities", i.e. groups of people with common goals or interests, have formed to share information through web-based "bulletin boards", and the like, which present a common area of storage of information. The Web is particularly well suited to exchange of information between members of virtual communities because the Web allows members from any geographic location to access the same commonly shared area of information by using a desired URL.

A universal requirement of any information sharing application, such as bulletin boards for virtual communities, is the ability to post information to the commonly shared area and the ability to access the posted information quickly and easily. However, conventional techniques require that the programmer incorporate the specific files containing the information to be made available, or a link to these files, into the HTML code of the web page. Therefore, human interaction is required to make posted information available over the web to client computers running a web browser. In some cases, users can post pre-determined types of information, such as text messages and responses thereto, which are made available to other users without the need for reprogramming. Specifically, some bulletin boards have limited capacity to display information without the need for human intervention. For example, a text message can be typed into a form to be transferred, without being saved as a file, and quickly displayed on the bulletin board. However, conventional bulletin boards do not permit the downloading and posting of any and all types of files in an automatic manner, i.e. without the need for human intervention. It is often desirable to share various objects of any type, such as software programs, graphic files, audio and video files, links to web pages, or any other file. Conventional bulletin boards do not permit the sharing of objects without reprogramming of the web page.

Another common way of sharing information among various users is through email messages and files attached thereto. However, when using email to share information, the author must know in advance the email address of each intended recipient because SMTP only permits the message and attachment to be viewed by the addressee. Of course, ,as the number of addressees increases, the number of required messages increases and required file storage space can become very high. For example, a virtual community of N users will require $2^N$ messages merely to share a single file with each person in the group. Further, when sharing files via email, it is difficult to make sure that each recipient has the most updated version of a file because the updated version must be sent to each recipient every time it is updated. Also, there is an inherent delay in the receipt of each message and attachment because the message is held on a mail server until the addressee logs into the mail server to retrieve it and thus email is not suitable for spontaneous interaction.

File Transfer Protocol (FTP) is another subset of TCP/IP that permits a client computer to upload a file from or to a server computer. However, FTP does not provide any means for displaying an icon or other representation of the file on a web page and permitting downloading of the file without human intervention. Once the file is uploaded, a web master must post the file manually on a web page.

Various proprietary software packages, such as NetMeeting™ from Microsoft™ are available for sharing documents over phone lines or the Internet. However, these require the installation of additional proprietary software and the inherent learning curve associated with new software.

Thus, a need exists for allowing a user to upload objects to a World Wide Web server over the Internet and for automatically and immediately making the objects available for downloading over the Internet by client computers running standard web browser software.

SUMMARY OF THE INVENTION

It is an object of the invention to facilitate the exchange of information over the Internet.

It is an object of the invention to permit a file or object uploaded from a client computer to a web server to be posted on a web page of the server computer for viewing on client computers running a web browser without the need for human interaction.

It is another object of the invention to permit an uploaded object to be automatically and immediately posted on a web server and downloaded to client computers running a web browser.

It is another object of the invention to allow objects to be shared, and maintained over the Web using conventional HTTP and HTML compliant web browsers.

The invention permits communities of users to readily share objects, such as program files, data files, video files, movie files, or the like, over the Internet using only a standard web browser and the well known interface thereof. The web site administrator need only modify the web site control program to include the software objects of the invention. Once the software of the invention is installed on the server, client computers can access the server through the Internet with a web browser and share objects.

The invention is useful for automatic dissemination of objects prior to a conference call, actual meeting, or virtual meeting. Presenters can upload presentations, documents and exhibits to be displayed on a predetermined display page corresponding to the meeting. All participants in the meeting can then access the display page through client computer having web access and a web browser to download, print or view the meeting documents prior to or during the meeting. "Virtual teams" can have private work areas and display pages on the server to share objects. Access to the private display page can be restricted to members of the team or each object can have a password associated therewith to limit access to members of the team.

The invention can be used to develop shared object libraries. Anyone with web access can share a large repository of objects. The objects can be password protected, categorized and maintained in a manner similar to sharing over a local area network. A user profile database can be created to allow document originators to maintain a descriptive profile about themselves and their document to avoid reentry of the same information with each upload.

The upload function and other object management functions are triggered by clicking on a web page icon. Uploaded objects can be displayed in any manner or format by modifying the display object. The display object can allow the document originator to select the icon to be displayed in association with the object. The look and feel of the upload function in context with other information on the web page can be changed as desired.

An upload wizard can be provided to allow the web page author to select any of the options described above to create a custom appearance or to request custom descriptive information about the originator or the object (or to allow anonymous posting). The wizard can allow the author to select predefined templates for each function of the invention or can allow the author to create custom templates to be used over again.

A representation of uploaded objects is displayed by the server computer to be viewed as a web page with the browser of the client computer and the representation is automatically updated after an object is uploaded. The uploaded objects on the server computer render the uploaded objects accessible by other client computers running a web browser and connected to the Internet.

The objects of the present invention are achieved by a computer architecture which includes a server computer having a storage device and a communication interface. The server computer is coupled to the World Wide Web. A client computer, also connected to the WWW, has a storage device and display means. The client computer runs a web browser which connects to the server through the Internet and the communication interface. A display means displays an upload request interface on the display means of the client computer. A receiving means receives command and object information from the client computer and uploads an object stored in the storage device of the client computer corresponding to the object information transmitted from the client computer to the server computer. A display means displays a representation of uploaded objects to be viewed as a web page using a web browser on the client computer and automatically updates the representation after an object is uploaded. The storing means stores uploaded objects on the storage device of the server computer.

The foregoing objects of the present invention are also achieved by a computer-implemented method of rendering uploaded objects accessible by other client computers running a web browser. The server computer displays an upload interface for viewing with the web browser of a client computer. An upload command and object information is received from the client computer. An object corresponding to the object information from the client computer is uploaded. A representation of uploaded objects is displayed by the server computer to be viewed as a web page with the browser of the client computer. The representation is automatically updated after an object is uploaded. The uploaded objects are stored on the server computer.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments and its several details are capable of modifications in various obvious respects, all without departing from the invention. Accordingly, the drawings and description thereof are to be regarded as illustrative in nature, and is not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for sharing and maintaining objects on a web page are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Software Overview:

The preferred embodiment of the present invention includes a set of software objects that collectively provide interactive object management functions when inserted on a web page by the author of the web page. The phrase "software object", as used herein, refers to a software package containing data and processing that works closely with the data. The software objects of the present invention can be encapsulated as needed. The term "encapsulated", as used herein, refers to the state in which a software object is packaged to restrict access to internal attributes of the software object. Encapsulation is a well known technique and will not be discussed in detail herein. The term "object" is used herein to indicate a file, program, data structure, address, command, or the like having a graphical representation, such as an icon associated therewith. The word "server" or the phrase "server computer", as used herein, refers to a computer having a URL on the Web on which the web pages and underlying control software incorporating the invention reside. The word "client" or the phrase "client computer", as used herein, refers to the computer accessing the web pages on the server over the Internet with a web browser.

Figure 1:
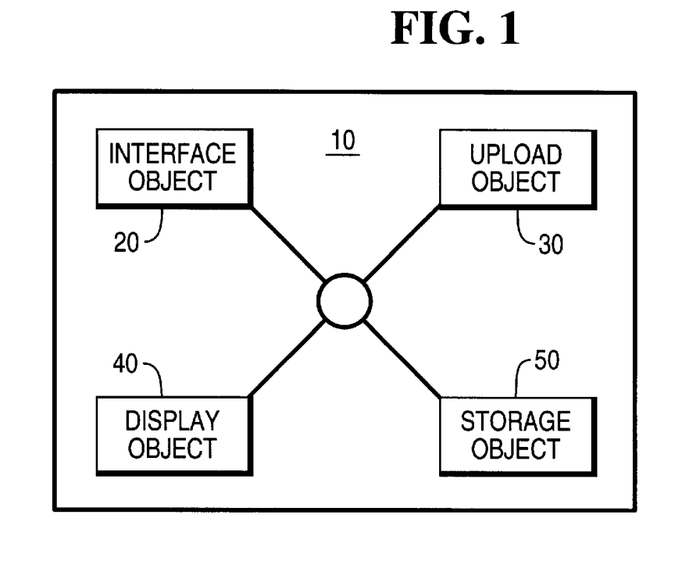
FIG. 1 is a block diagram of the software application of the preferred embodiment.

Software application 10 of the preferred embodiment of the invention, includes four primary software objects 20, 30, 40, 50, as illustrated in FIG. 1, which can be inserted into the software controlling a server by the author to provide the required interactive object management functions of the invention. A brief summary of the overall function provided by each software object is contained below, followed by a more detailed description of each software object. The software objects themselves can include plural software objects. Alternatively, software application 10 need not be comprised of software objects and each software "object" described below can merely be thought of as a module, function, or portion of software code.

The first software object is interface object 20 which includes software code and algorithms which insert an "upload button", such as a default or author chosen icon, into a designated web page. Alternatively, the first object can present a "drag and drop" interface for uploading and downloading files. The first object or interface object can be any type of interface link on a Web page. By clicking on the interface object, the next object is launched. The second software object is upload object 30 which includes software code and algorithms which perform the upload function and other subsequent editing functions. The third software object is display object 40 which includes the software codes and algorithms to automatically regenerate the web page to include a representation of the uploaded object. The fourth software object is storage object 50 which includes the software codes and algorithms to store uploaded files in association representations displayed by display object 30 for selective downloading to a client computer. All of the software objects preferably reside in a memory of the server computer as discussed in greater detail below. The four primary software objects interact with each other, as indicated by the interconnecting lines of FIG. 1, to accomplish the desired functions described in detail below and each object can be understood as different instances or instantiations of the same object.

The first step in implementing the invention is for the web page author, or another administrator, to insert the software objects into the control software of an existing web server, by modifying the software running on the server. The server software is preferably written in an object oriented programming language which permits additional software objects to be inserted therein without modification of the original program. Various known object oriented programming languages are known. For example, Java™ or C++ can be used. The software objects of the invention discussed above are written in the same object oriented programming language for insertion into the original server software controlling the function of the web pages on the server. Of course, the software of the invention and the existing server software can be in a language other than an object oriented language. However, in such a case, it may be more tedious to integrate the program code of the invention into the existing software. Therefore, the software components of the invention are preferably, but not necessarily, software objects and are referred to as such herein when describing the preferred embodiment.

Figure 2:
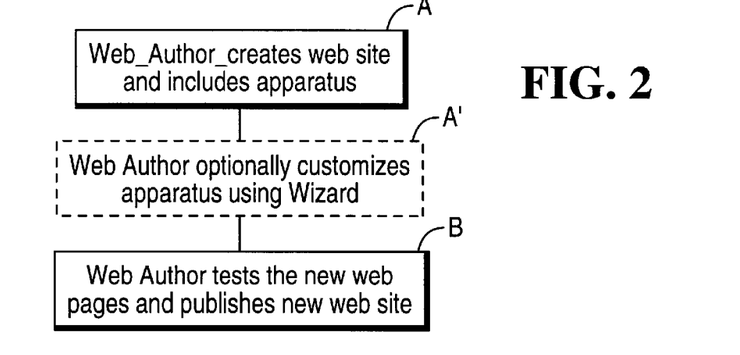
FIG. 2 is a flowchart of the web site customization procedure of the preferred embodiment.

As illustrated in FIG. 2, which is flow chart of the web site development for inserting the software objects of the invention, the author first creates the web site and the necessary software control thereof on the server. The modules of the invention are included in the web site control software by being inserted as objects, prepackaged functions known as "web bots", or by any programming means, in step A. In step B, the author tests the function of the web pages locally and, if the test is successful, publishes the web pages over the Web in a conventional manner. As an option, a wizard can be provided that guides the author through installation and customization of the modules of the invention in step A'. For example, the author can be prompted to choose the size and placement of the upload button.

Interface object 20 includes the requisite graphics to present the user interface for downloading, such as a download button, by inserting the interface into the appropriate HTML code of the web pages in the server. Interface object 20 can present any appropriate interface, such as a drag and drop interface or other buttons or links. Once interface object 20 is integrated into the control software of the server computer and the web pages on the server computer are published, i.e. made available over the Web, a user at a client connected to the Internet can view the web pages on the server and utilize this function of the invention.

Figure 3:
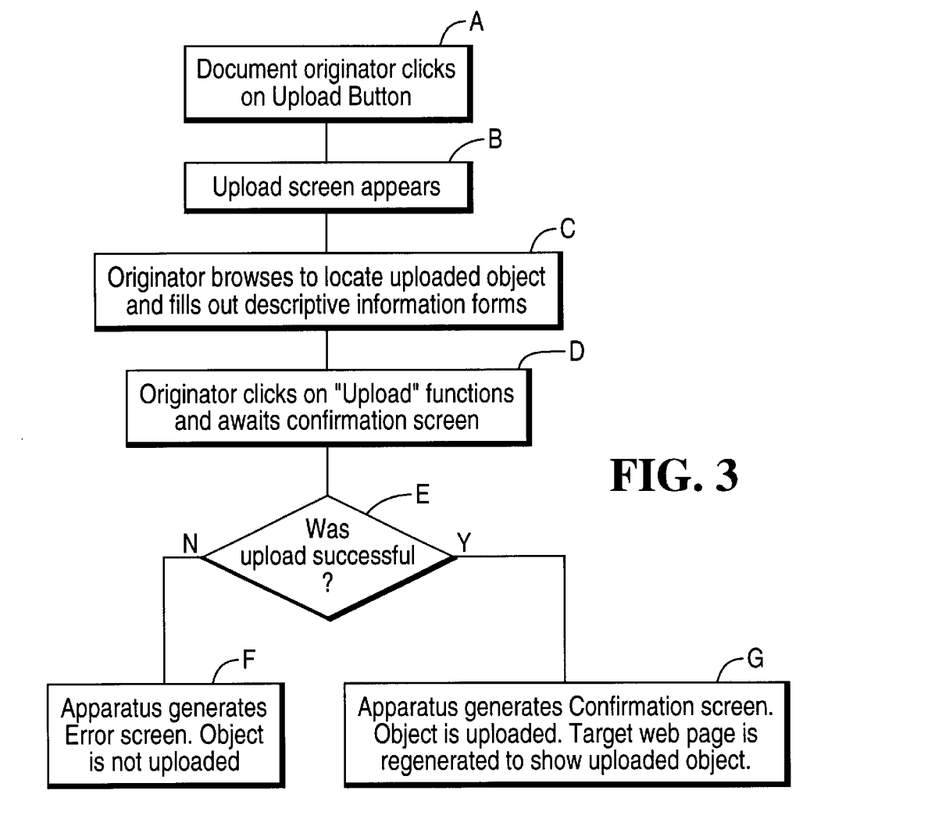
FIG. 3 is a flowchart of the upload procedure of the preferred embodiment.
Figure 6:
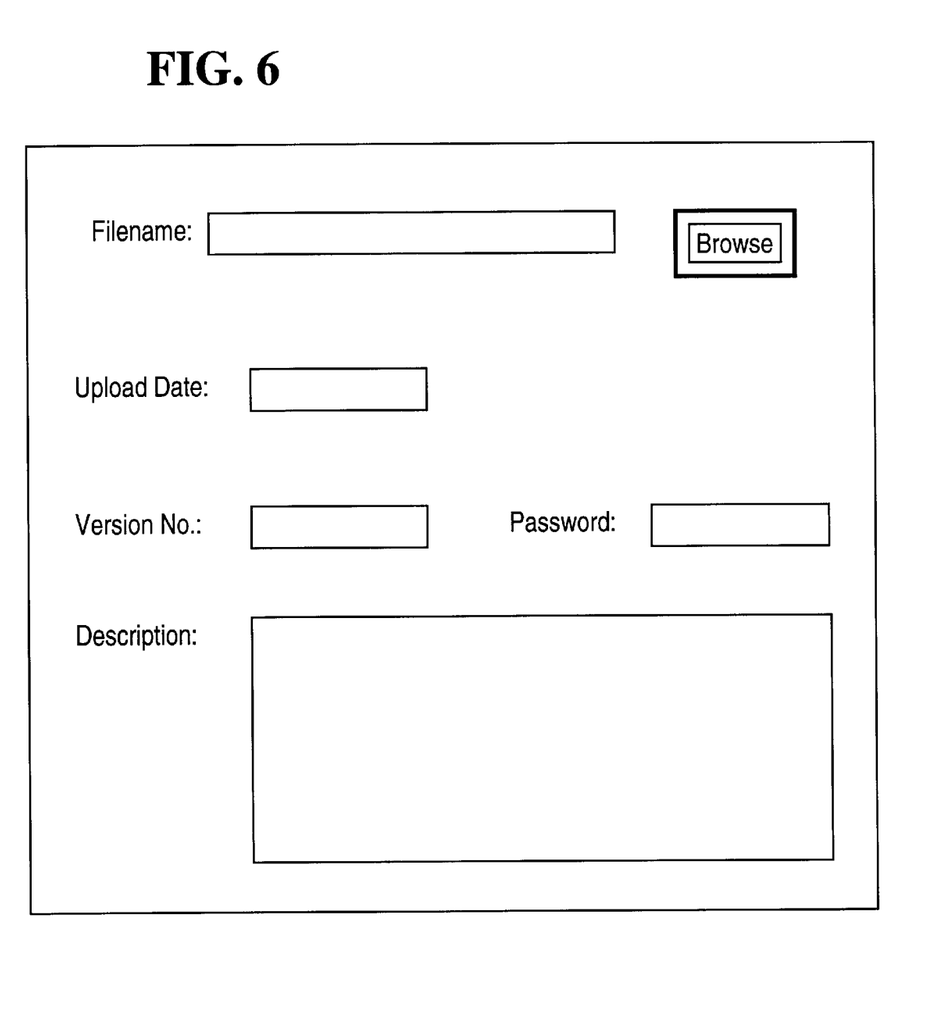
FIG. 6 illustrates an upload dialog box of the preferred embodiment.

FIG. 3 is a flow chart illustrating the function of upload object 30 of the invention. After a document originator on a client computer has accessed the web page on the server containing the upload button, the document originator can select the upload button, by clicking on it with a mouse or other pointing device, in step A. As a result, an upload screen will be presented to the document originator in step B. FIG. 6 illustrates an example of a dialog box presented on the upload screen. The dialog box requests various descriptive information about the object to be uploaded, such as the path name and filename, the date of uploading, the version number, a password for restricting access to the object by others, and other descriptive information. A browse button can be presented to permit the originator to select the object to be uploaded in a graphical object oriented manner. In step C, the originator locates the object to be uploaded and enters the descriptive information in the upload dialog box. In step D, the originator clicks on the upload button in the upload dialog box to being the upload operation of the object from the client to the common storage area of the server.

Figure 7:
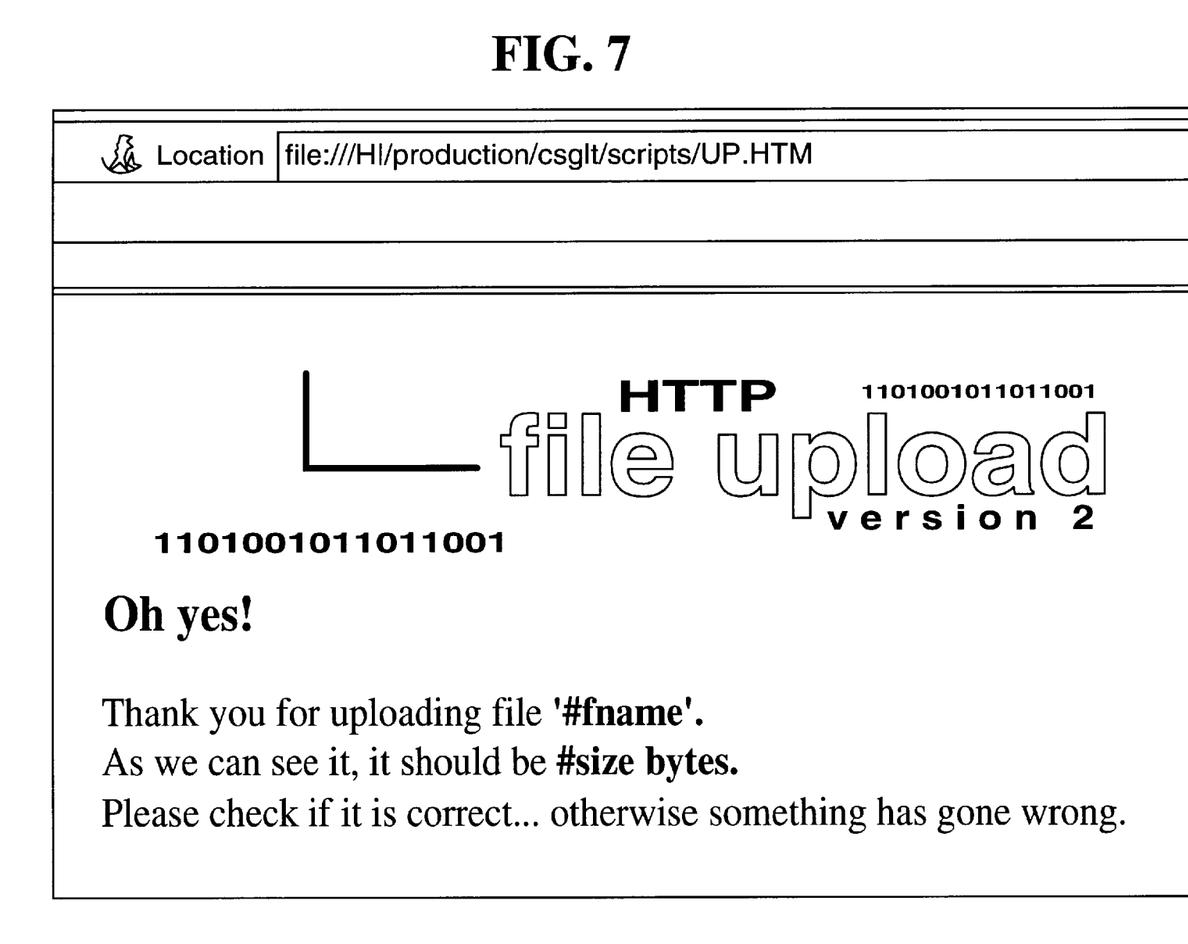
FIG. 7 illustrates an upload confirmation screen of the preferred embodiment.
Figure 8:
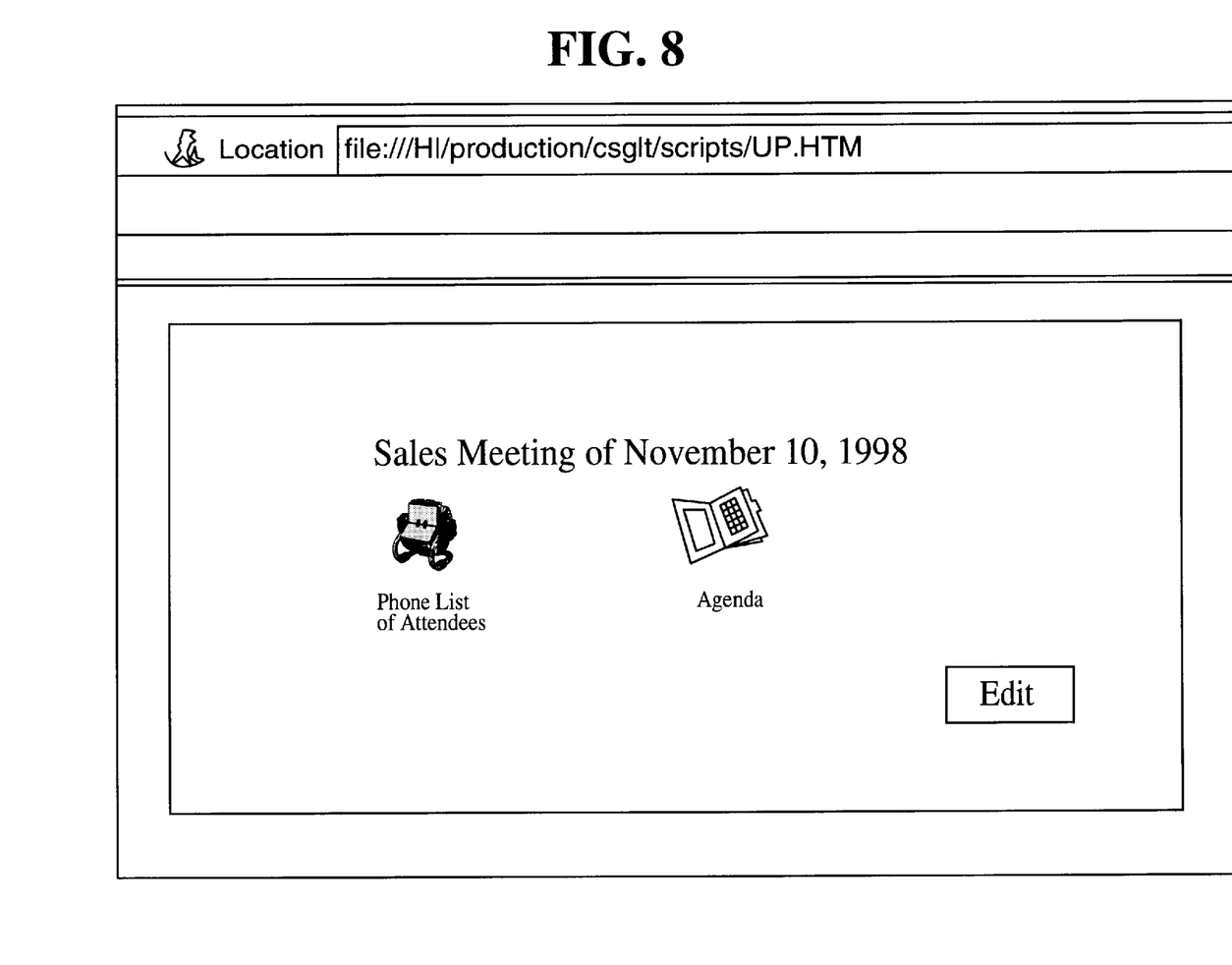
FIG. 8 illustrates a display screen of uploaded objects of the preferred embodiment.
Figure 9:
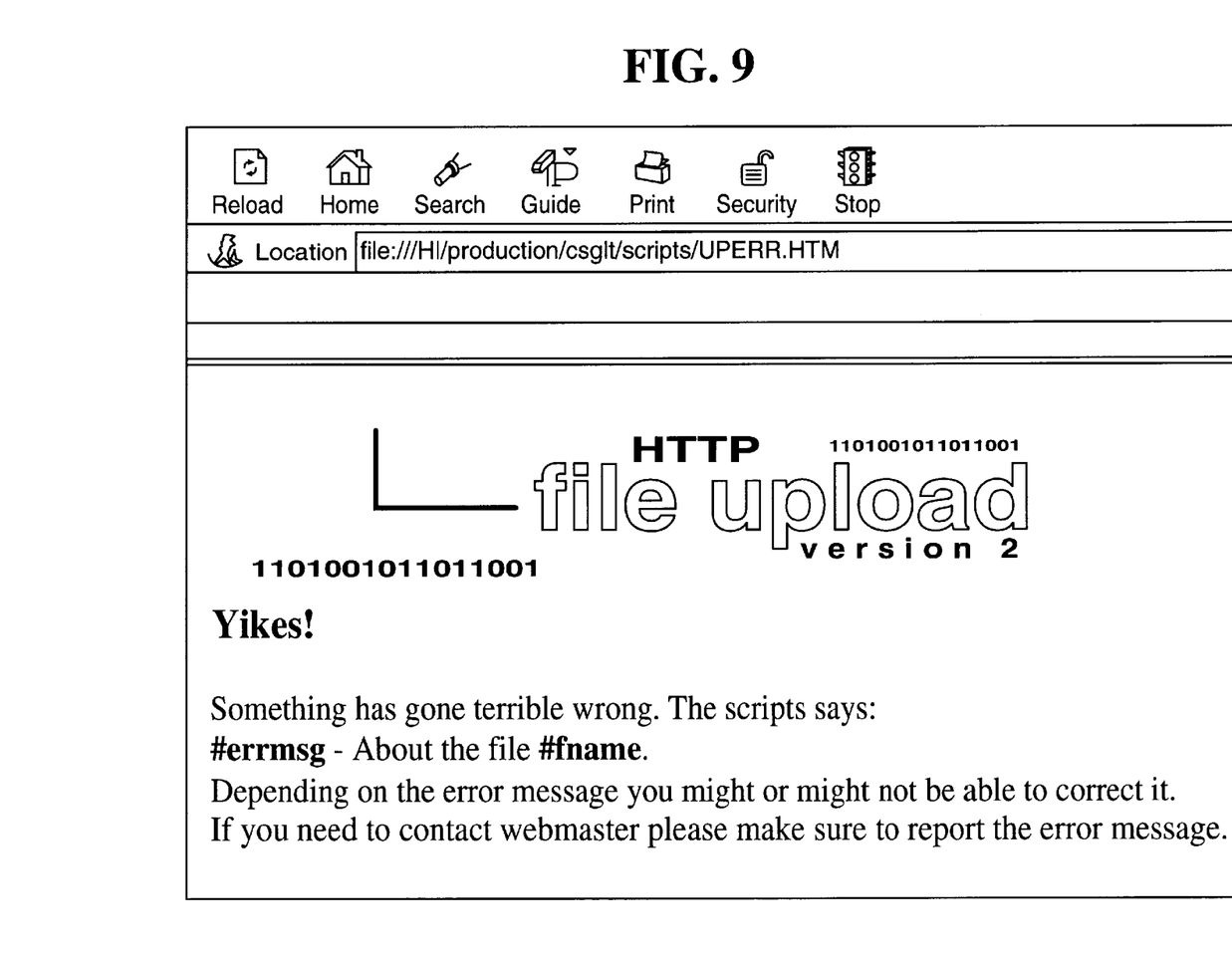
FIG. 9 illustrates an upload error screen of the preferred embodiment.

Storage object 50 stores the uploaded file in the proper area of memory of the server. Step E confirms whether the upload was successful using any one of various techniques. If the upload was successful, processing proceeds to step G in which an upload confirmation screen, such as that illustrated in FIG. 7 is displayed. Also, in step G, display object 40 regenerates the web page serving as a display of shared objects to include an icon or other representation of the uploaded object. FIG. 8 illustrates an example of the display web page showing various objects that have been uploaded. The display web page can include various information such as the size of the object, the name of the object, and icon associated with the object, and the file modification date. The display page of FIG. 8 corresponds to documents made available for a particular sales meeting. Icons are displayed for each available document, or object. Additional information relating to the objects can be displayed on the display page or through entering a command such as clicking on a link or selecting a menu item. Of course, more or less information can be collected and displayed as is desired. In the event that the error check of step E indicates that the object was not uploaded successfully, the error screen illustrated in FIG. 9 is displayed on the browser of the client computer in step F. The error screen will incorporate an error message to assist the originator in correcting the problem. In such a case, the originator can click the back button on the browser tool bar of the client computer and try to upload again after correcting the problem.

Figure 4:
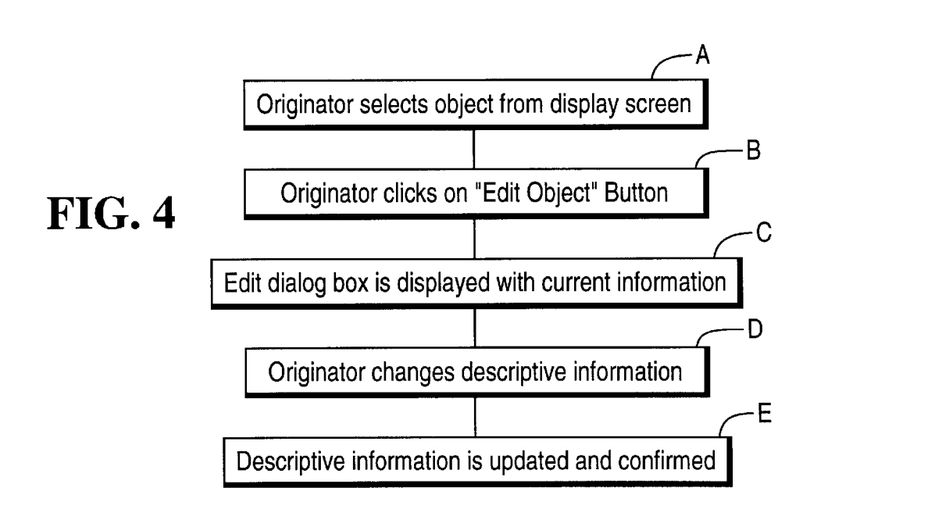
FIG. 4 is a flowchart of the edit procedure of the preferred embodiment.

Upload object 30 also controls the ability of the originator, or other party, to edit the descriptive information of any object. FIG. 4 is a flowchart of the editing procedure. Of course, as noted above, a password or other security measure can be associated with the object to restrict access to the object including the descriptive information. Assuming the party has access to the object, the party can select any object (step A) and click the "edit" button to display a screen similar to the download screen of FIG. 6 (step B). The party can then change any of the descriptive information, except for the filename (step D). Upload object 30 and display object 40 will then update the upload screen accordingly, and storage object 50 will update the stored object accordingly.

Figure 5:
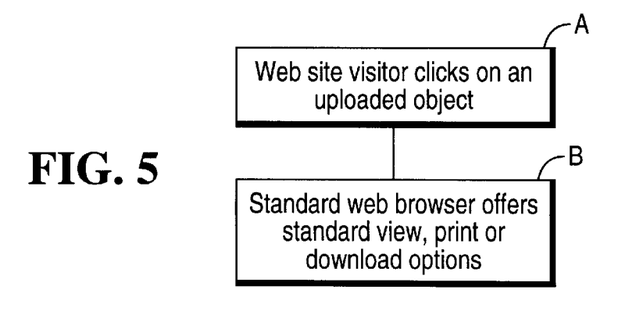
FIG. 5 is a flowchart of the download procedure of the preferred embodiment.

FIG. 5 is a flowchart illustrating the download process. A visitor to the web site views the upload display page of FIG. 8 using the web browser of a client computer and selects an object to be downloaded in step A. The visitor then can use the standard web browser view, print, or download functions to accomplish the desired function in step B.

Hardware Overview

Figure 10:
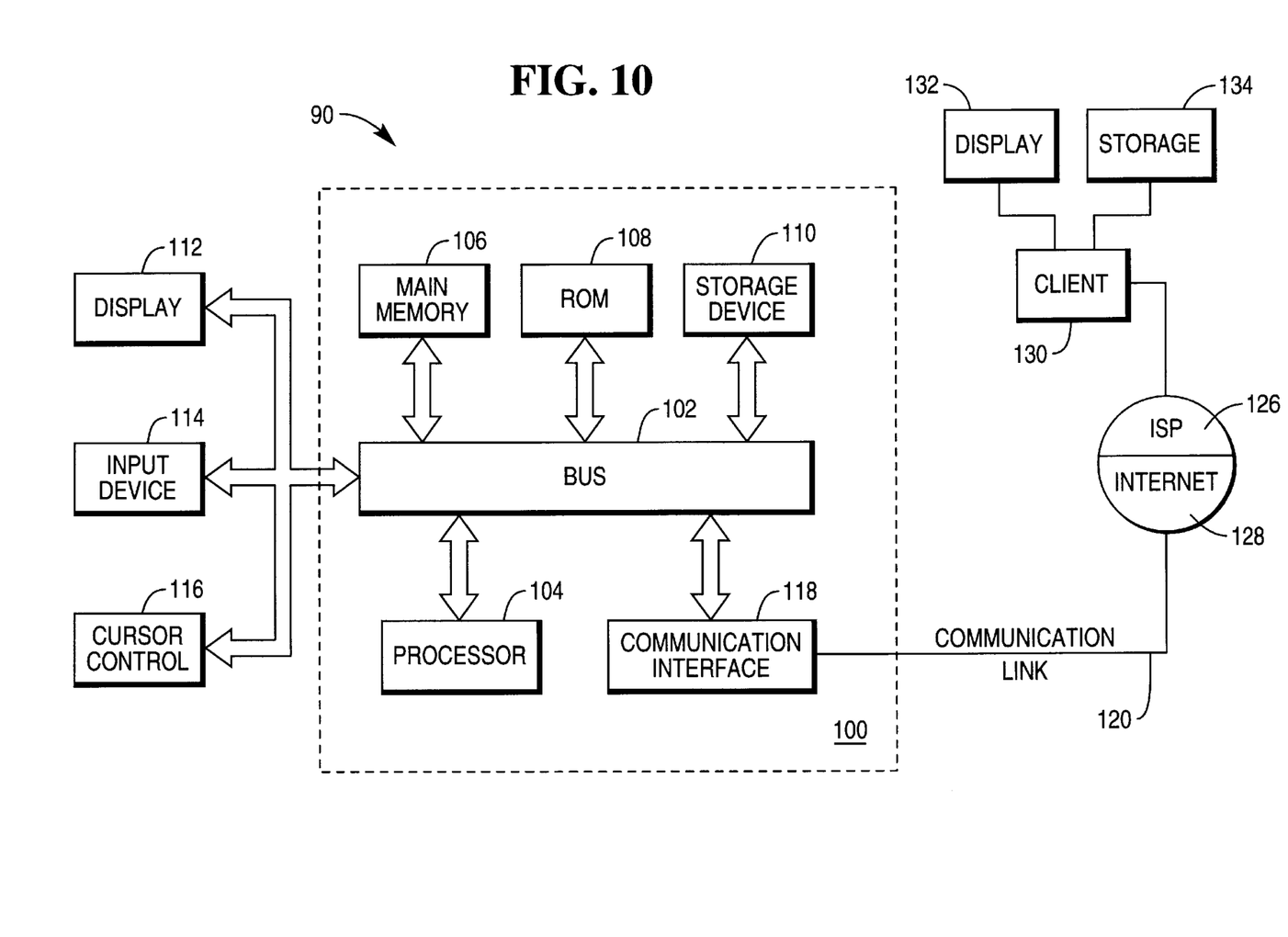
FIG. 10 is a schematic block diagram of the computer architecture of the preferred embodiment.

FIG. 10 is a block diagram illustrating an exemplary computer architecture 90 upon which an embodiment of the invention may be implemented. The present invention is usable with currently available personal computers, mini-mainframes and the like.

Computer architecture 90 includes FIG. 10 which is a block diagram illustrating an exemplary computer architecture 90 upon which an embodiment of the invention may be implemented. The present invention is usable with currently available personal computers, mini-mainframes and the like.

Computer architecture 90 includes server 100 having a bus 102 or other communication mechanism for communicating information, and a processor 104 coupled with the bus 102 for processing information. Server 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Server 100 further includes a read only memory (ROM) 108 or other static storage device coupled to the bus 102 for storing static information and instructions for the processor 104. A storage device 110, such as a magnetic disk or optical disk, is provided and coupled to bus 102 for storing information and instructions, i.e. the web site control program including the software objects of the invention.

Server 100 may be coupled via bus 102 to display 112, such as a cathode ray tube (CRT) or a flat panel display, for displaying information to a web site author or administrator. Input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g.,) allowing the device to specify positions in a plane.

Server 100 is the server for the web site controlled in accordance with the invention. For example, all of the HTML files and the corresponding control program therefore are stored on computer system 100 and the appropriate web pages are displayed to a client computer by server 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described above. However, the invention is not limited to any specific combination of hardware and software.

Server 100 also includes communication interface 118 coupled to bus 102. Communication interface 118 provides two-way data communication as is known. For example, communication interface 118 may be an integrated services digital network (ISDN) card or a modem to provide a data communication connection to a corresponding type of telephone line. In the preferred embodiment communication interface 118 is coupled by communication link 120 (such as an analog or digital phone line) to the world wide packet data communication services through the world wide packet data communication network now commonly referred to as the "Internet" 128. Wireless communication links may also be implemented. In any such implementation, communication interface 118 sends and receives electrical, electromagnetic, optical, or other signals which carry digital or analog data streams representing various types of information through Internet 128.

Server 100 can send and receive data through communication link 120 and communication interface 118. For example, client 130, running a web browser might transmit a requested command through ISP (Internet Service Provider) 126, Internet 128, communication link 120, and communication interface 118. In accordance with the invention, the commands control the server in the manner described above to upload objects stored on storage device 134 of client 130, update a display screen web page viewed on display 132 of client 130 automatically, and provide access to the displayed objects over the Internet through a conventional web browser. While not illustrated in detail, client 130 can be configured similarly to server 100. For example, client 130 can be a conventional personal computer and can be running a known web browser such as Internet Explorer™ or Netscape Navigator™.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. An article, comprising:
   at least one sequence of machine executable instructions;
   a medium bearing the executable instructions in machine readable form, wherein execution by one or more processes causes the one or more processes to:
   display an upload interface by a server computer for viewing the web browser of a client computer on the Internet;
   receiving, by the server computer, an upload command and object information from the client computer and for uploading an object corresponding to the object information sent from the client computer to the server computer over the Internet; comprising limiting access to each object based on object information transmitted from the client computer; wherein said object information comprises a password;
   displaying a representation of uploaded objects by the server computer to be viewed as a web page with the browser of the client computer and automatically updating the representation after an object is uploaded; and
   storing the uploaded objects on the server computer for rendering the uploaded objects accessible by other client computers running a web browser and connected to the internet.

2. The article of claim 1, wherein the upload interface displays an upload button.

3. The article of claim 1, wherein the upload interface displays a drag and drop interface.

4. The article of claim 1, wherein the received object information includes a filename corresponding to the object to be uploaded.

5. The article of claim 1, wherein the displayed representation of uploaded objects includes an icon representing each object.

6. The article of claim 5, wherein the received object information includes information indicating a particular icon to represent the corresponding uploaded object in the displayed representation.

7. The article of claim 1, wherein the stored objects are stored in different locations based on the object information received by the server computer and representations of the objects are displayed in each location separately.

8. The article of claim 7, comprising limiting access to each representation of the objects based on identification information transmitted from the client computer.

9. The article of claim 8, wherein said identification information comprises a password.

10. A computer architecture, comprising:
    a server computer having a storage device and a communication interface, said server being coupled to the World Wide Web;
    a client computer having a storage device, and display means, said client computer running a web browser and being coupled to said server through the internet and said communication interface;
    display means for displaying upload request interface on said display means of said client computer; comprising limiting access to each object based on objects information transmitted from the client computer; wherein said object information comprises a password;
    receiving means for receiving an upload command and object information from said client computer and for uploading an object stored in the storage device of said client computer corresponding to the object information transmitted from said client computer to said server computer;
    display means for displaying a representation of uploaded objects to be viewed as a web page using a web browser on said client computer and for automatically updating the representation after an object is unloaded; and
    storing means for storing uploaded objects on said storage device of said server computer.

11. A computer architecture as recited in claim 10, wherein the upload interface comprises an upload button.

12. A computer architecture as recited in claim 10, wherein the upload interface comprises a drag and drop interface.

13. A computer architecture as recited in claim 10, wherein the object information includes a filename corresponding to the object to be uploaded.

14. A computer readable medium as recited in claim 10, wherein the representation of uploaded objects includes an icon representing each object.

15. A computer architecture as recited in claim 14, wherein said object information includes information indicating a particular icon to represent the corresponding uploaded object in the representation displayed by said server computer.

16. A computer architecture as recited in claim 10, wherein the stored objects are stored in different locations based on the object information received by the server computer and representations of the objects are displayed in each location separately.

17. A computer architecture as recited in claim 16, wherein access by the client computer to each representation of the objects is limited based on identification information transmitted from said client computer to said server computer.

18. A computer architecture as recited in claim 17, wherein said identification information comprises a password.

19. A computer-implemented method of rendering uploaded objects accessible by other client computers running a web browser, said method comprising the steps of:

displaying, on the server computer, an upload interface for viewing with the web browser of a client computer;

receiving an upload command and object information from the client computer and uploading an object corresponding to the object information from the client computer to the server computer over the Internet; wherein said object information comprises a password;

displaying a representation of uploaded objects by the server computer to be viewed as a web page with the browser of the client computer and automatically updating the representation after an object is uploaded;

wherein access to each object is limited based on object information transmitted from the client computer; and storing the uploaded objects on the server computer.

20. The method recited in claim 19, wherein the upload interface displayed in said causing step comprises an upload button.

21. The method recited in claim 19, wherein the upload interface displayed in said causing step comprises a drag and drop interface.

22. The method recited in claim 19, wherein the object information received in said receiving step includes a filename corresponding to the object to be uploaded.

23. The method recited in claim 19, wherein the representation of uploaded objects displayed in said displaying step includes an icon representing each object.

24. The method recited in claim 23, wherein the object information received in said receiving step includes information indicating a particular icon to represent the corresponding uploaded object in the representation displayed in said display step.

25. The method recited in claim 19, wherein the stored objects are stored in different locations based on the object information received by the server computer and representations of the objects are displayed in each location separately.

26. The method recited in claim 25, wherein displaying step limits access to each representation of the objects based on identification information transmitted from the client computer.

27. The method recited in claim 26, wherein said identification information comprises a password.

* * * * *